(12) United States Patent
Graham

(10) Patent No.: US 7,501,574 B1
(45) Date of Patent: Mar. 10, 2009

(54) CONDUCTOR SUPPORT ASSEMBLY

(75) Inventor: Larry Graham, Hollsopple, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 0 days.

(21) Appl. No.: 11/977,044

(22) Filed: Oct. 22, 2007

(51) Int. Cl.
*H02G 7/20* (2006.01)

(52) U.S. Cl. ............................ 174/45 R; 174/45 TD; 174/3; 174/40 R; 174/41; 174/99 R; 248/70; 248/58; 191/41; 361/107

(58) Field of Classification Search ............... 174/45 R, 174/45 TD, 3, 40 R, 43, 99 R, 137 R, 41; 248/61, 63, 64.58; 361/107; 191/32; 343/890; 52/101, 291, 146
See application file for complete search history.

(56) References Cited

U.S. PATENT DOCUMENTS

| | | | |
|---|---|---|---|
| 2,455,606 A | 12/1948 | Pleiss | |
| 3,259,762 A * | 7/1966 | Skuderna | 307/109 |
| D213,254 S | 1/1969 | Hollingsworth | |
| 3,468,571 A * | 9/1969 | Farmer | 403/381 |
| 4,018,438 A | 4/1977 | Shoger | |
| D278,172 S | 3/1985 | Ellis | |
| 4,679,672 A * | 7/1987 | Seddon et al. | 191/41 |
| D378,457 S | 3/1997 | Page | |
| 6,127,625 A * | 10/2000 | Castano | 174/40 R |
| 6,143,980 A * | 11/2000 | Blanding | 174/40 CC |
| 7,057,103 B1 * | 6/2006 | Peabody | 174/45 R |
| 7,368,660 B2 * | 5/2008 | Hardy | 174/40 R |
| 7,456,354 B1 * | 11/2008 | Wawrzeniak et al. | 174/45 R |

* cited by examiner

*Primary Examiner*—Dhiru R Patel
(74) *Attorney, Agent, or Firm*—Stuart J. Friedman

(57) ABSTRACT

A support assembly for supporting a high voltage electrical conductor suspended from a lattice-type tower during maintenance and repair includes a pair of elongate support arms, each of the support arms having an aperture extending therethrough intermediate its ends, the aperture opening in a direction transverse to the length of the support arms, and an elongate conductor support bar slidably received in the apertures of the support arms and extending between the support arms to define with the support arms a generally H-shaped support assembly, the support arms being slidable on the support bar for adjusting the distance between the arms and being movable on the support bar between a first position wherein the arms are parallel to each other and a second position wherein the arms are arranged at an angle to each other.

13 Claims, 3 Drawing Sheets

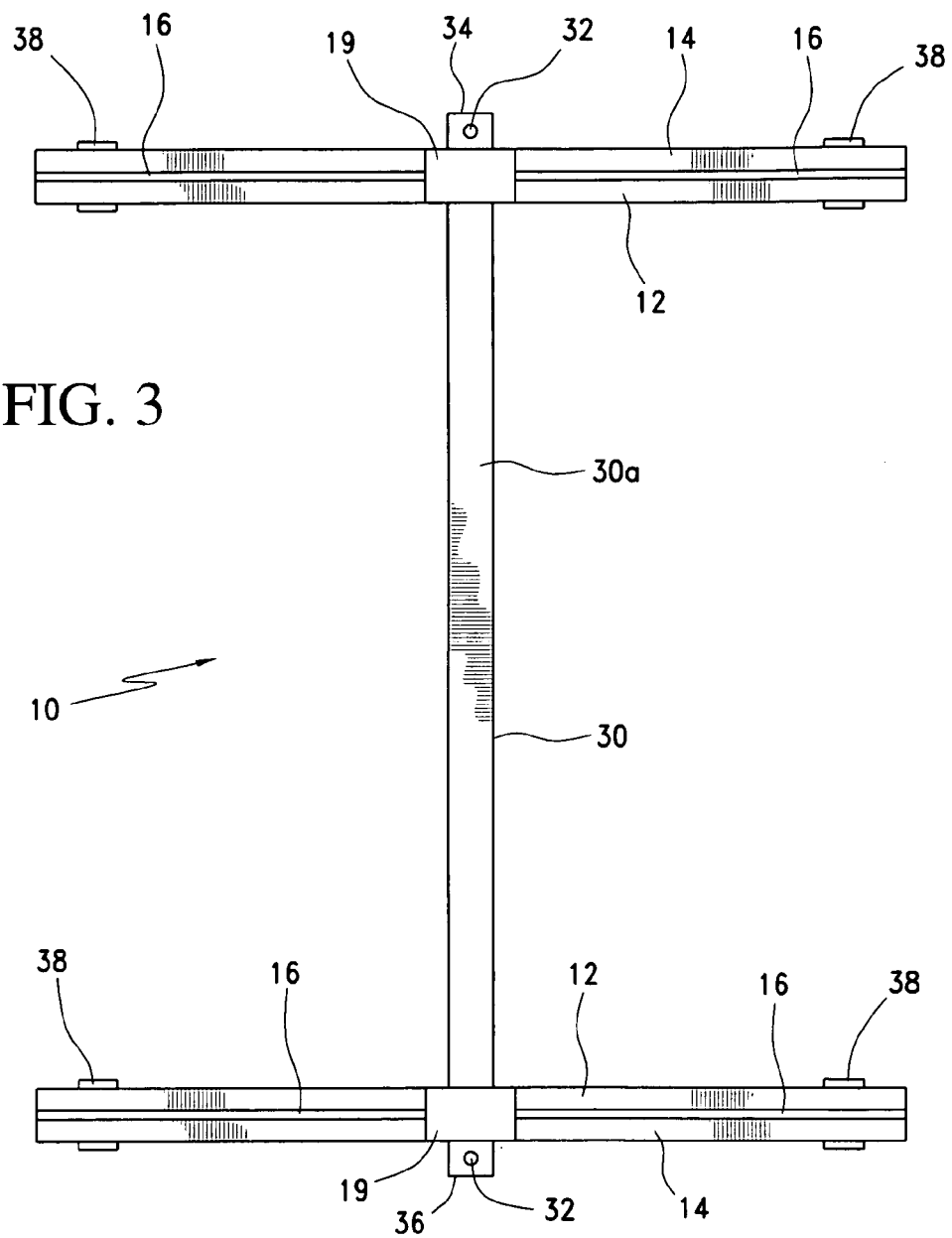
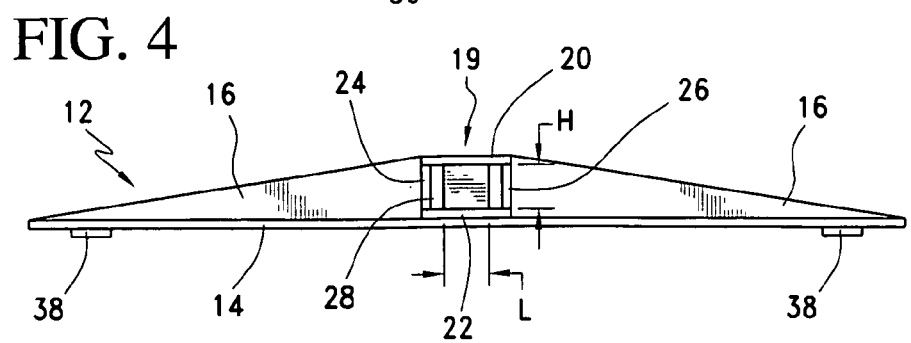

CONDUCTOR SUPPORT ASSEMBLY

FIELD OF THE INVENTION

The present invention relates to support assemblies for high voltage electrical conductors and, more particularly, to a support assembly for supporting an electrical conductor during insulator replacement on lattice-type towers.

BACKGROUND OF THE INVENTION

High voltage power transmission lines carrying voltages in the hundreds of kilowatt range have been constructed to extend from spaced towers or poles in terrain which is often practically inaccessible to land vehicles. In recent years, a number of methods and devices have been developed to facilitate the repair and maintenance of high voltage power transmission lines which are accessed by helicopter.

Lattice-type towers are employed for supporting multiple high voltage electrical conductors. The conductors are typically supported under the arms or bridges of such towers using a pair of suspension insulators per conductor. Periodically, it is necessary to replace the insulators because they are visibly damaged or as part of a general maintenance plan. Typically, insulators are attached via pins to the towers and via pins to a yoke plate which supports the conductor. These pins must be manually removed by linemen placed on the tower via helicopter in order to replace the insulators. Damaged or worn insulators are removed from the tower via helicopter and replacement insulators are delivered to the tower via helicopter. It will be appreciated that high voltage electrical conductors are extremely heavy and their great weight hanging from the end of an insulator makes it impossible to unpin and remove the insulator without first creating slack in the insulator. To accomplish this the conductor must be supported in some fashion during insulator removal and replacement. In the past, lineman have improvised temporary rigging to support the conductors. For example, multiple chain hoists have been used which are supported via multiple nylon slings at multiple spaced locations along tower girders. Such improvisation requires large amounts of equipment, is time consuming and fails to adequately distribute the weight of a supported conductor over a large area of the tower structure.

Accordingly, there exists a need for a device which may be safely emplaced on a tower via helicopter, which is light enough to be handled by a lineman on a tower, which is strong enough to support a heavy electrical conductor, which will be stable on a structure such as a lattice-type tower and which will distribute the weight of a supported conductor over the tower structure.

SUMMARY OF THE INVENTION

It is, therefore, a primary object of the present invention to provide a novel and improved conductor support assembly which can be safely handled and used on a lattice-type tower by lineman emplaced on the tower by a helicopter.

It is also an object of the present invention to provide a novel and improved conductor support assembly which is sufficiently lightweight that it can be hand positioned by a lineman on a lattice-type tower yet sufficiently strong to support a heavy high voltage conductor.

It is another object of the present invention to provide a novel and improved conductor support assembly which includes means for stabilizing the assembly when emplaced on a lattice-type tower.

It is yet another object of the present invention to provide a novel and improved conductor support assembly which is capable of distributing the weight of the conductor over as much of the tower as possible.

It is still another object of the present invention to provide a novel and improved conductor support assembly which can be easily reconfigured on the tower to accommodate both parallel and non-parallel girder configurations, and which can be supported upon and will distribute the weight of the conductor to both girder configurations.

The foregoing and other objects are achieved in accordance with the present invention by providing a conductor support assembly for supporting a high voltage electrical conductor suspended from a lattice-type tower during maintenance and repair comprising:

a pair of elongate support arms, each of said support arms having an aperture extending therethrough intermediate its ends, said aperture opening in a direction transverse to the length of said support arms; and an elongate conductor support bar slidably received in the apertures of said support arms and extending between said support arms to define with said support arms a generally H-shaped support assembly, said support arms being slidable on said support bar for adjusting the distance between said arms and being movable on said support bar between a first position wherein said arms are parallel to each other and a second position wherein said arms are arranged at an angle to each other. In one embodiment, as seen in planes passing through the apertures and longitudinally along each support arm, the support bar is generally rectangular in cross section and the apertures are generally rectangular in cross section.

In another aspect of the invention, there is provided a conductor support assembly wherein the cross-sectional length of the rectangular apertures in the longitudinal direction is sufficient in relation to the cross-sectional length of the support bar in the longitudinal direction to permit said support arms to be movable between said first and second positions. Desirably, the cross-sectional length of the rectangular apertures is 50% to 150% longer than the cross-sectional length of the support bar, preferably 100% longer.

In still another aspect of the invention, there is provided a conductor support assembly for use on a lattice-type tower comprising a plurality of interconnected girders, the support assembly being supported on the tower with each of the support arms positioned on a girder, the elongate support arms having a width at least as wide as the width of the girder on which it is positioned, whereby the weight of a support conductor is distributed over the tower structure. In a preferred embodiment, the support assembly further includes girder engaging tabs attachable to and adjustably positionable at spaced locations along the support arms for engaging the girders on which the support arms are positioned for preventing the support assembly from sliding on said girders.

BRIEF DESCRIPTION OF THE DRAWINGS

FIG. 3 is a top plan view of the conductor support assembly of the present invention.

FIG. 4 is a front elevational view of the conductor support assembly of FIG. 3.

DETAILED DESCRIPTION OF THE INVENTION

Figure 1:
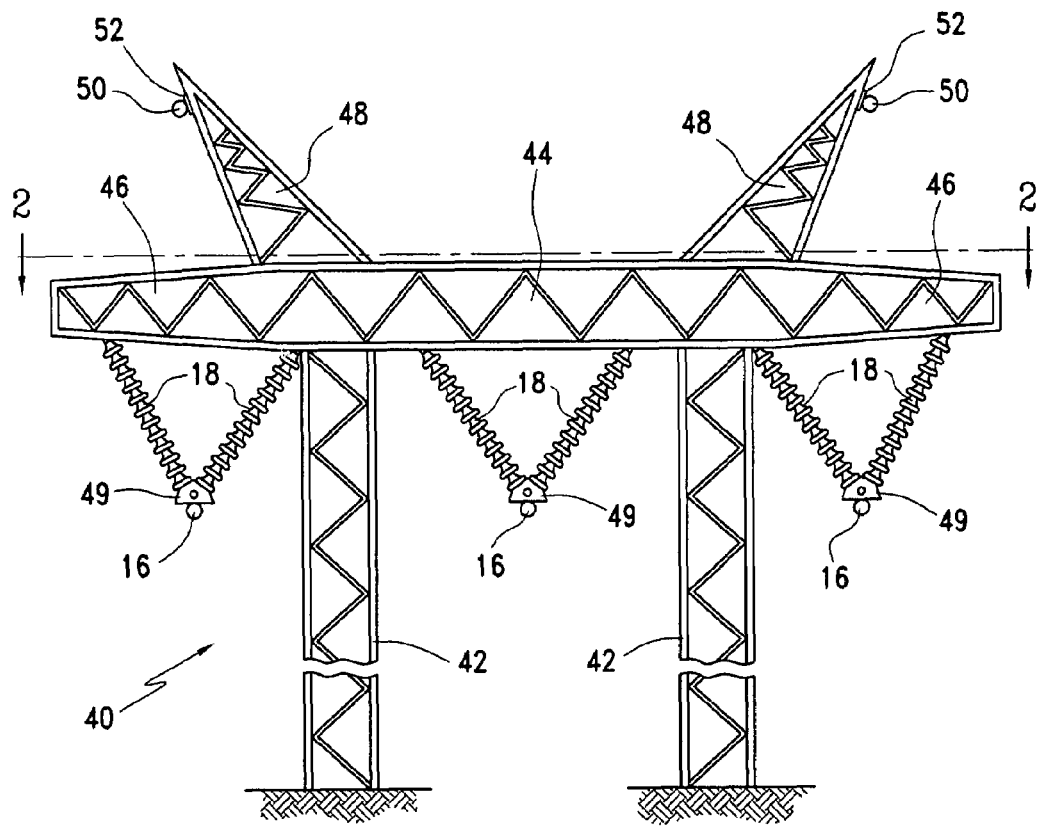
FIG. 1 is a front elevational view of a typical lattice-type tower for supporting high voltage power transmission lines.
Figure 2:
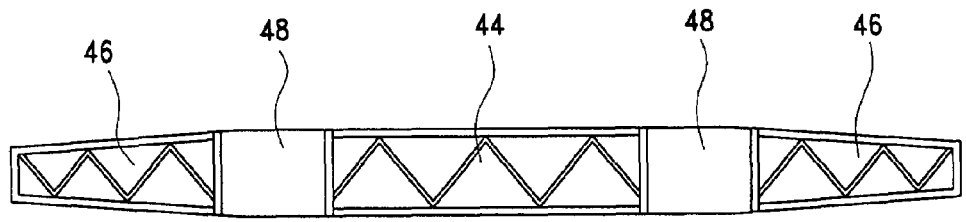
FIG. 2 is a top sectional view of the lattice-type tower taken along line 2-2 in FIG. 1.
Figure 5:
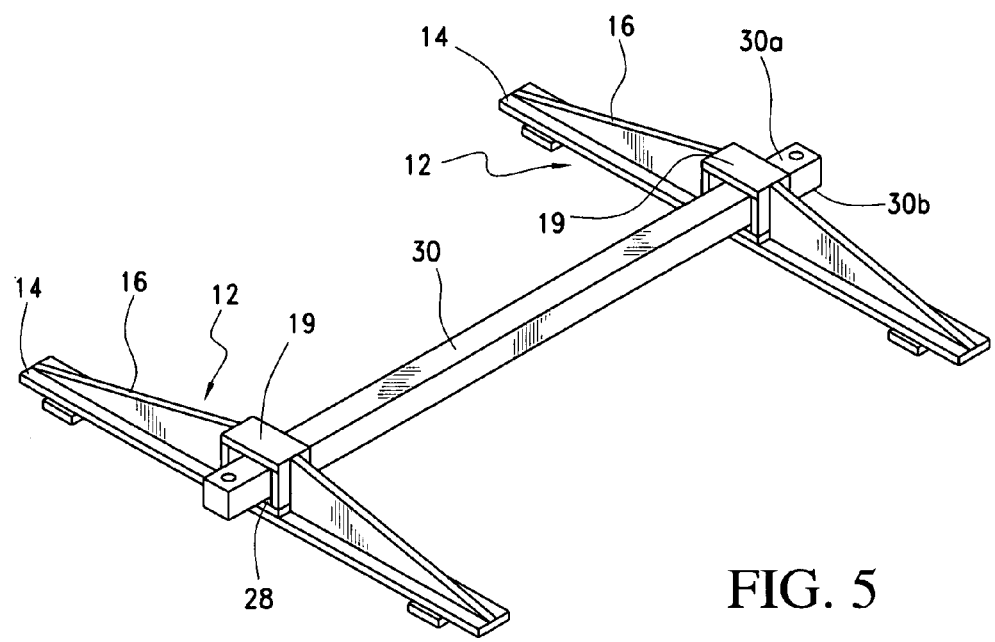
FIG. 5 is a perspective view of the conductor support assembly of FIG. 3.

Referring to FIGS. 1 and 2 there is shown a conventional steel lattice H-structure tower 40 for supporting multiple (frequently three) high voltage conductors 16. The lattice tower 40 comprises two legs 42 extending to the ground which support a central bridge 44 having left and right side extending tower arms 46. In addition, a pair of goat heads 48 extend upwardly and outwardly at an acute angle from the bridge 44 for supporting shield wires 50 via shield wire hardware 52. The lattice structure is typically constructed of angle stock. Central bridge structure 44 comprises an elongate rectangular box formed of angled stock girders, which gives the bridge a width as well as a depth. Left and right side extending tower arms 46 also comprise elongate boxes formed of angled stock girders except, as can be seen in FIGS. 1 and 2 respectively, the girders forming the tower arms 46 incline toward each other in both the vertical and horizontal planes. Conductors 16 are supported under each tower arm 46 and under central bridge 44 by a pair of suspension insulators 18 per conductor, with each pair of insulators 18 being spaced apart along the tower arms 46 and central bridge 44 to define a triangle formed by the two insulators 18 and the tower arms 46 or the central bridge 44, from which the insulators 18 depend. Typically, one end of each insulator 18 is connected via pins (not shown) to the tower arms 46 or central bridge 44 and the other end of each insulator 18 is connected via pins (not shown) to a yoke plate 49, which also supports conductor 16.

Referring to FIGS. 3-6, conductor support assembly 10 is designed to be safely emplaced on a lattice-type tower via helicopter, light enough to be handled by a lineman on a tower, strong enough to support a heavy electrical conductor, stable on a structure such as a lattice-type tower and capable of distributing the weight of a supported conductor over the tower structure.

The conductor support assembly 10 includes a pair of generally parallel elongate support arms 12, each of which has an elongate base member 14 extending in the longitudinal direction, a pair of generally right triangular web rib sections 16 supported on the base member 14 and extending in opposite directions along the base member 14 from a centrally disposed rectangular frame member 19. Rectangular frame member 19 has top, bottom and opposing side walls, designated 20, 22, 24 and 26 respectively, defining an elongate rectangular aperture 28. In one form of the invention, the base member 14, triangular web sections 16 and rectangular frame member 18 are welded to each other to form unitary support arms 12 which are generally triangular in side view (see FIG. 4) with the apex of the triangle approximately at the midpoint of the support arms 12. An elongate tubular support bar 30 extends between the generally parallel arms 12 and is slidable within apertures 28. Support bar 30 is generally rectangular, preferably square, in cross-section and has a cross-sectional length L extending in the longitudinal direction defined by base members 14 and a cross-sectional height H, which is perpendicular to its length L. As can be seen most clearly in FIG. 3, support bar 30 defines with support arms 12 a generally H-shaped support assembly 10. Bolt-receiving apertures 32 are desirably formed in opposing walls adjacent the ends 34, 36 of support bar 30, preferably in top wall 30a and bottom wall 30b, for receiving headed stop bolts (not shown), which prevent the ends of support bar 30 from sliding out of apertures 28 after they have been inserted therein. Desirably, each of support arms 12 includes multiple girder engaging tabs 38 which are attachable to and adjustably positionable at spaced locations along base member 14 for engaging the girders underlying the base member 14 to prevent conductor support assembly 10 from sliding along the girders. Inasmuch as support girders vary in thickness and spacing, in order for the conductor support assembly 10 to be useful on most any lattice-type tower, the tabs 38 must be attachable to base member 14 in a variety of ways, e.g., via clamps, bolts, etc., and at multiple locations along the base member 14. In one preferred embodiment, tabs 38 are positioned along the underside of a support girder and bolted to base member 14 using bolt holes (not shown) which may be formed in the tabs 38 and the base member 14.

Figure 6:
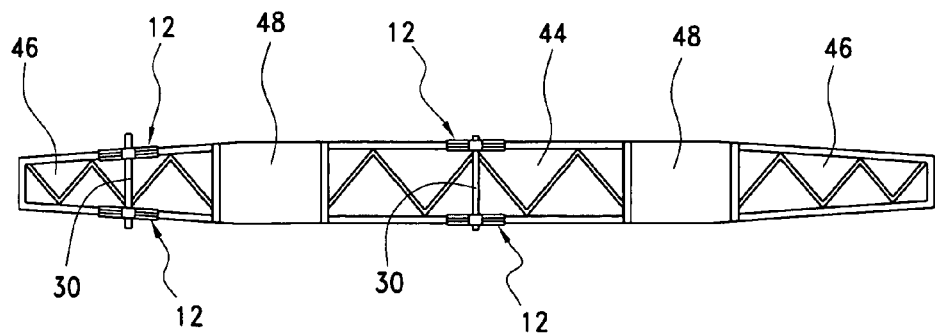
FIG. 6 is a schematic top view of the lattice-type tower showing the conductor support assembly of the present invention emplaced on the parallel girders of the central bridge and on the inclined girders of one of the arms of the lattice-type tower of FIG. 1.

In use, the conductor support assembly 10 is positioned on the central bridge or arm girders, as shown in FIG. 6, at a location above the conductor 16 to be supported. In order to facilitate the stable positioning of the conductor support assembly 10 on the girders, the support arms 12 are each slidable on support bar 30 and, in this manner, the distance between them can be adjusted to allow each arm 12 to sit upon the girders of the central bridge 44 or tower arms 46. Desirably the width of each of the base members 14 is at least as wide as the width of the girder on which it sits in order to spread the weight of the supported conductor 16 over as much of the tower structure as possible. Although the top girders of the central bridge 44 are generally parallel, it can be seen from FIG. 2 that the top girders of the tower arms 46 taper toward each other in the direction away from the central bridge 44. To accommodate this taper and to be certain that the support arms 12 sit fully upon the girders of the tower arms, apertures 28 in support arms 12 are desirably rectangular in shape with the long sides 20, 22 of the rectangle extending along the longitudinal extent of base members 14 and having a greater length than the cross-sectional length L of support bar 30. Aperture 28 is slightly oversized along the short sides 24, 26 of the rectangle relative to the cross-sectional height dimension H of the support bar 30. This allows the support arms 12 to be easily slidable along support bar 30 and to be angled toward each other sufficiently to match the taper of the tower arms 46. Desirably, the length of rectangular apertures 28 is sufficient to allow the support arms 12 to be angled to match the taper of the tower arms 46 while still performing their guiding and sliding function relative to support bar 30. To accomplish this the long sides 20, 22 of rectangular apertures 28 are desirably 50% to 150% longer than the corresponding cross-sectional length dimension L of the support bar 30, preferably about 100% longer. To assure easy sliding of the support bar 30 within rectangular apertures 28, the short sides 24, 26 or height of rectangular apertures 28 (i.e., in a direction perpendicular to base member 14) are desirably 10% to 20% longer than the corresponding cross-sectional height dimension H of support bar 30, preferably about 10% to 15% longer.

After the conductor support assembly 10 has been positioned on the central bridge or tower arm girders, as shown in FIG. 6, at a location above the conductor 16 to be supported, assembly 10 can be used in various ways to support the conductor 16. In one preferred usage of the assembly 10, a nylon sling is hung over support bar 30 and the free ends of the sling are attached to a bracket to which a chain hoist is also attached. The free end of the chain hoist desirably attaches to the yoke plate 48 where the conductor 16 and insulators 18 come together. The chain hoist may then be operated, e.g., via a manually operated ratchet hoist, to lift the conductor 16 toward the support bar 30, thus creating slack in insulators 18 and allowing them to be unpinned. After an insulator 18 is unpinned it is carried away via a helicopter and a replacement insulator 18 is delivered to the work site for pinning to the yoke plate 49 and the central bridge 44 or tower arms 46. In an alternate usage of the assembly 10, a second nylon sling can be positioned under the conductor 16 and its free ends attached to a second bracket to which the free end of the chain hoist is also attached.

For purposes of illustration only, a useful conductor support assembly includes a base plate 14 of each support arm 12 having a length of about 48" and a width of about 3", the triangular web has a thickness of about ½" and the aperture 28 is a rectangle measuring about 5" in length and 2¾" in height. Support bar 30 is usefully 2½" square tubing formed of high strength steel and is about 5' long. Girder engaging tabs 38 are each about 3" long, ½" high and ½" wide.

While the present invention has been described in terms of specific embodiments thereof, it will be understood that no limitations are intended to the details of construction or design other than as defined in the appended claims.

The invention claimed is:

1. A support assembly for supporting a high voltage electrical conductor suspended from a lattice-type tower during maintenance and repair comprising:
   a pair of elongate support arms, each of said support arms having an elongate aperture extending therethrough intermediate its ends, said aperture in a direction transverse to the length of said support arms; and
   an elongate conductor support bar slidably received in the apertures of said support arms and extending between said support arms to define with said support arms a generally H-shaped support assembly, said support arms being slidable on said support bar for adjusting the distance between said arms and the length of said apertures being sufficient in relation to the cross-sectional length of said support bar to permit said support arms to be movable on said support bar between a first position wherein said arms are parallel to each other and a second position wherein said arms are arranged at an angle to each other.

2. A support assembly, as claimed in claim 1, wherein said support bar is generally rectangular in cross section and said apertures are generally rectangular, the lengthwise extending sides of said apertures and said support bar extending along the length of said support arms and the heightwise extending sides of said apertures and said support bar extending substantially perpendicular to the length of said support arms and extending upwardly therefrom.

3. A support assembly, as claimed in claim 2, wherein said length of said apertures is 50% to 150% longer than the corresponding cross-sectional length of said support bar.

4. A support assembly, as claimed in claim 2, wherein said length of said apertures is about 100% longer than the corresponding cross-sectional length of said support bar.

5. A support assembly, as claimed in claim 2, wherein said height of said apertures is 10% to 20% larger than the corresponding cross-sectional height of said support bar.

6. A support assembly, as claimed in claim 5, wherein said height of said apertures is 10% to 15% larger than the corresponding cross-sectional height of said support bar.

7. A support assembly, as claimed in claim 2, wherein said support bar is square in cross-section.

8. A support assembly, as claimed in claim 2, wherein said support bar is tubular.

9. A support assembly, as claimed in claim 1, wherein said lattice-type tower comprises a plurality of interconnected girders, said support assembly being supported on said tower with each of said support arms positioned on one of said girders, said elongate support arms having a width at least as wide as the width of one of said girders on which it is positioned, whereby the weight of a support conductor is distributed over the tower structure.

10. A support assembly, as claimed in claim 9, further including girder engaging tabs attachable to and adjustably positionable at spaced locations along said support arms for engaging the girders on which said support arms are positioned for preventing said support assembly from sliding on said girders.

11. A support assembly, as claimed in claim 1, wherein each of said elongate support arms comprises an elongate base member, a rectangular frame member intermediate the ends of and supported by said base member, said rectangular frame member having top, bottom and opposing side walls defining a rectangular aperture having a length extending in a direction along said base member and a height extending in a direction upwardly from said base member, said aperture in a direction transverse to the length of said base member, and rib members interconnecting said rectangular frame member and said base member on both sides of said rectangular frame member.

12. A support assembly, as claimed in claim 11, wherein said rib members comprise right triangular webs having a first side adjacent a side wall of said rectangular frame member and a second side adjacent said base member.

13. A support assembly, as claimed in claim 1, further including removable means on said support bar for preventing the ends of said support bar from inadvertently sliding completely through either of said apertures.

* * * * *